United States Patent [19]

Tagami et al.

[11] 4,376,909
[45] Mar. 15, 1983

[54] AUTOMATIC LIGHT CONTROL FOR AUTOMOTIVE VEHICLES

[75] Inventors: Katsutoshi Tagami, Asaka; Yoshikazu Tuchiya, Kawagoe, both of Japan

[73] Assignee: Honda Giken Kogyo Kabushiki Kaisha, Tokyo, Japan

[21] Appl. No.: 138,528

[22] Filed: Apr. 9, 1980

[30] Foreign Application Priority Data

Apr. 13, 1979 [JP] Japan ................................ 54-45111
Apr. 13, 1979 [JP] Japan ................................ 54-45112

[51] Int. Cl.³ .............................................. B60Q 1/02
[52] U.S. Cl. ...................................... 315/82; 315/83; 307/10 LS; 340/76
[58] Field of Search .............. 315/82, 83; 307/10 LS; 340/76

[56] References Cited

U.S. PATENT DOCUMENTS

| | | | |
|---|---|---|---|
| 3,270,245 | 8/1966 | Keeran | 315/83 |
| 3,775,639 | 11/1973 | Woodward | 315/83 |
| 4,045,769 | 8/1977 | Faller | 315/82 |
| 4,117,453 | 9/1978 | Hodgson et al. | 315/83 |
| 4,139,801 | 2/1979 | Linares | 315/83 |
| 4,236,099 | 11/1980 | Rosenblum | 315/83 |
| 4,249,160 | 2/1981 | Chilvers | 315/82 |

FOREIGN PATENT DOCUMENTS

| | | | |
|---|---|---|---|
| 1455956 | 9/1963 | Fed. Rep. of Germany | 315/82 |
| 1156325 | 10/1963 | Fed. Rep. of Germany | 315/82 |
| 2245568 | 9/1972 | Fed. Rep. of Germany | 315/82 |
| 2311687 | 12/1976 | France | 315/83 |
| 1237125 | 6/1971 | United Kingdom | 315/82 |
| 1463730 | 2/1977 | United Kingdom | 315/82 |

Primary Examiner—Saxfield Chatmon, Jr.
Attorney, Agent, or Firm—Lyon & Lyon

[57] ABSTRACT

An automatic light control for automotive vehicles includes a relay connected to a power source by way of a main switch and an electronic switch, and a control circuit for on-off control of the electronic switch. In the control circuit, a brightness sensor produces a signal representing the ambient brightness which is compared with a predetermined reference signal by comparator means. The electronic switch is turned on or off in response to the difference in output of the comparator means to energize or deenergize the relay to thereby turn the vehicle lights on or off. The control may include two main light control circuits of identical configuration arranged in parallel, each of which serves as a back-up circuit for the other, and a monitor circuit adapted to issue an alarm when the two circuits produce unequal outputs.

11 Claims, 4 Drawing Figures

AUTOMATIC LIGHT CONTROL FOR AUTOMOTIVE VEHICLES

BACKGROUND OF THE INVENTION

This invention relates to an automatic light control for use in an automotive vehicle, which is capable of automatically turning on and off the automotive vehicle lights such as head lamps in response to the brightness of the surroundings of the running vehicle.

During running of vehicles, automotive vehicle lights such as head lamps should be timely turned on or off in response to the ambient brightness for safety running as well as for low consumption of the vehicle battery. Even in the daytime, the driver has many chances to turn the head lights or the side marker lights on or off in response to the ambient brightness, for instance, when passing through tunnels or driving in thick fog.

Conventionally, the on-off switching operation of the automotive vehicle lights is manually done and accordingly the driver finds it troublesome to perform the on-off action. Further, the driver may often fail to turn off the head lamps, etc. after passing through a tunnel in the daytime, or when parking the vehicle at night, for instance.

OBJECTS OF THE INVENTION

It is therefore an object of the invention to provide a novel automatic light control system for use in an automotive vehicle which is capable of automatically turning on and off the automotive vehicle lights, such as head lamps, by electronic means in response to the ambient brightness of its surroundings, and which is also capable of forcedly turning off the lights simultaneously with the stopping the vehicle engine, thereby avoiding failure to turn off the lights.

It is a further object of the invention to provide an automatic light control system for use in an automotive vehicle which includes two main light control circuits provided in parallel with each other, each of which serves as a back-up circuit for the other, and a monitor circuit for monitoring these control circuits, whereby the monitor circuit detects and displays an abnormality upon occurrence of the abnormality.

These and other objects, features and advantages of the invention will become more apparent upon reading the ensuing detailed description and the accompanying drawings.

DETAILED DESCRIPTION

First, one embodiment of the invention will be described with reference to FIGS. 1 and 2.

Figure 1:
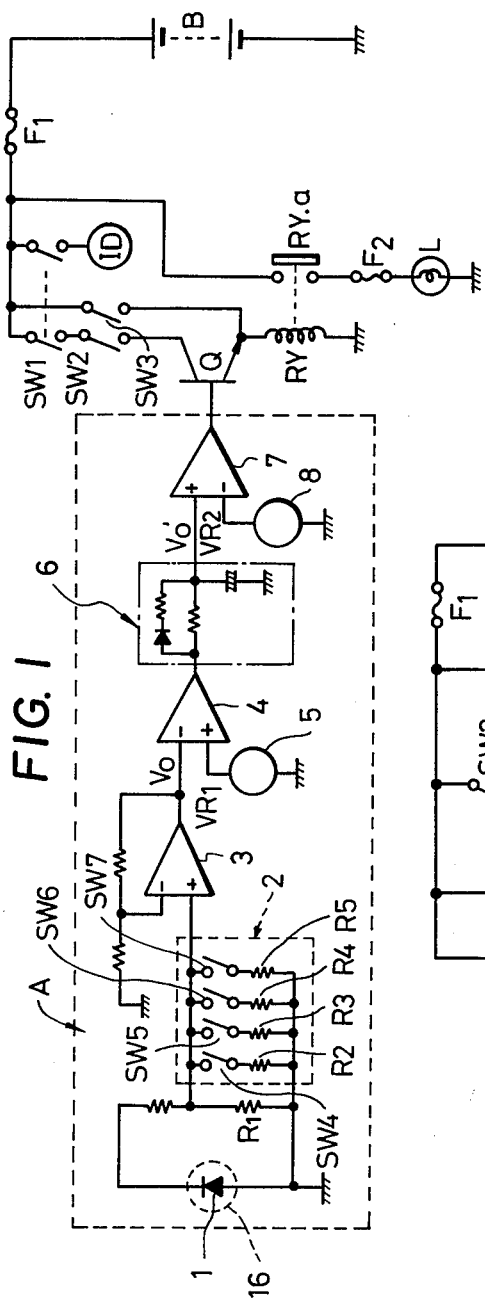
FIG. 1 is an electrical circuit diagram of the automatic light control system for vehicles according to one embodiment of the invention.

FIG. 1 illustrates the fundamental circuit arrangement of the automatic light control system according to the invention. Symbol B designates a battery used as a main power source to which are connected an ignition switch (double pole type) SW1 for turning on and off the ignition device ID of the vehicle engine and a light switch (main switch) SW2. Connected with these switches is the collector of a transistor Q which serves as an electronic switch. The transistor Q has its emitter connected to the electromagnetic coil of a relay RY which has its one end grounded. A cancelling switch SW3 is connected in parallel with the switches SW1, SW2 and the transistor Q to form a first circuit in cooperation with the latter elements and the power source B. A lamp L, which is to be used as a head lamp or a side marker lamp of the vehicle, is connected to the power source B by way of make contacts RY.a of the relay RY in parallel with the first circuit, to form a second circuit together therewith. Connected to the base of the transistor Q is a control circuit A which is adapted to carry out on-off control of the transistor Q in response to the ambient brightness. In this control circuit A, a brightness sensor 1, which is formed of a photo diode, is provided to detect extraneous light. A block 2 is connected to the brightness sensor 1 in parallel therewith to attenuate the sensitivity of the sensor 1, which is composed of a plurality of parallel pairs of resistances R1–R5 and switches SW4, SW5, SW6, SW7 connected in series. The block 2 is connected to the non-inverting input terminal of an operational amplifier 3 which amplifies the output voltage of the sensor 1. The amplifier 3 has its output connected to the inverting input terminal of a first comparator 4 which in turn has its non-inverting input terminal connected to a reference voltage generator 5 to compare the output VO of the amplifier 3 with the reference voltage VR1. The comparator 4 has its output connected to the non-inverting terminal of a second comparator 7 by way of an integrating circuit 6 for integrating the output of the comparator 4. The second comparator 7 is connected at its output with the base of the transistor Q with its inverting input terminal connected to a reference voltage generator 8 to compare the integral output VO' with the reference output voltage VR2 of the generator 8, the output of which causes on-off action of the transistor Q. Incidentally, in FIG. 1, symbol F1 designates a main fuse provided between the battery B and the first and second circuits, and F2 a fuse provided between the make contacts RY.a of the relay RY and the lamp L for protection of the lamp L from breakage due to current overload.

Figure 3:
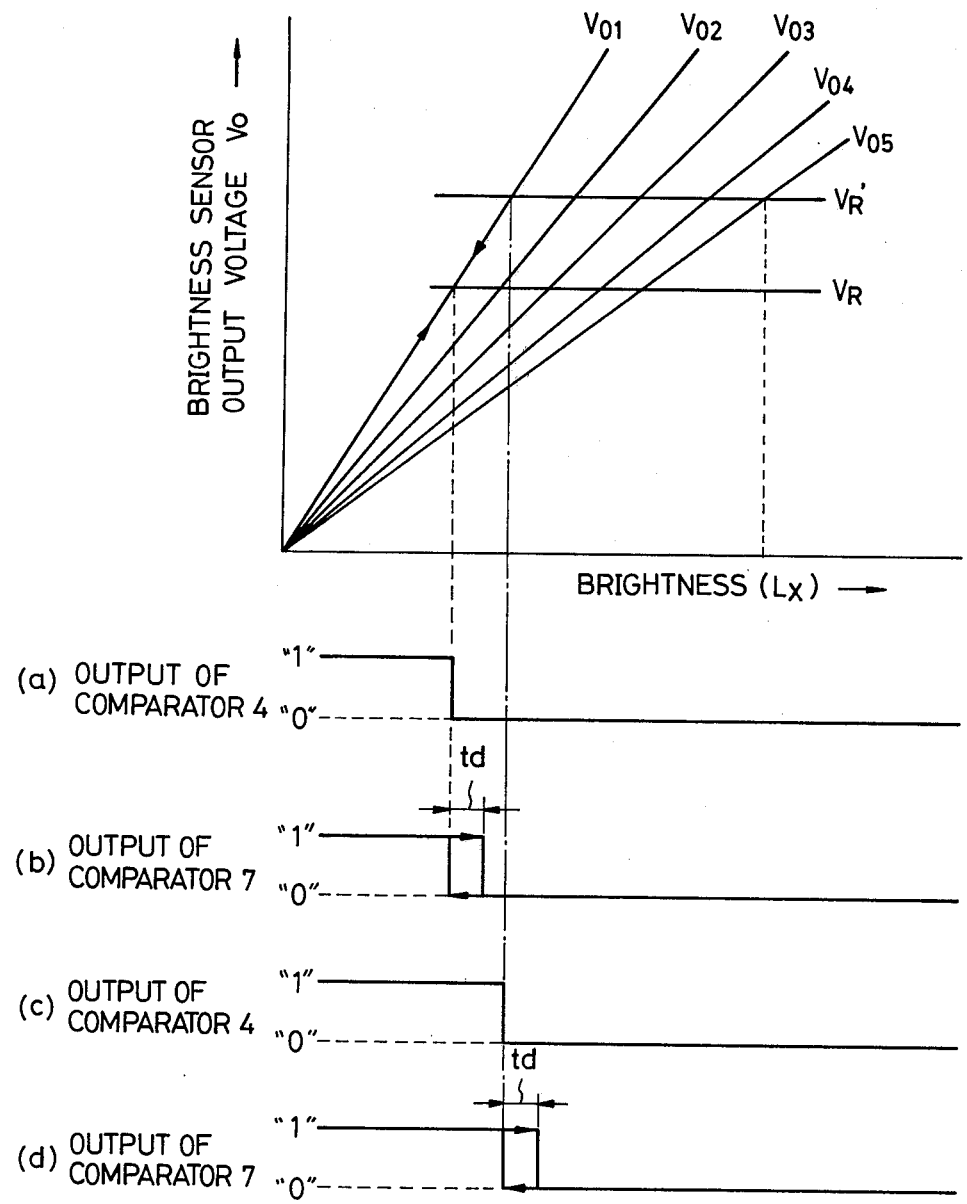
FIG. 3 is a graph showing the operating characteristics of the electrical circuit of FIG. 1.

The operation of the light control system according to the invention constructed as above will now be described. First, when the switches SW1 and SW2 are both closed, the brightness sensor 1 produces an output voltage upon being energized by outside light, which voltage is amplified by the amplifier 3. The amplified output VO is compared with the reference voltage VR1 by the first comparator 4. Then, the difference of voltage from the comparator 4 is integrated by the integrating circuit 6 into an integral voltage which is then compared by the second comparator 7 with the reference voltage VR2 which is on a same level with the reference voltage VR1. As shown in FIG. 3 (a), the first comparator 4 produces a binary output "1" if the amplified output VO is below or equal to the reference voltage VR1 and produces a binary output "0" if VO exceeds VR1. This binary output is subjected to integration with a reset time td, followed by comparison of the resulting integral output with the reference voltage VR2 so that the output of the second comparator 7 has a hysteresis between "1" and "0", as shown in FIG. 3

(b). That is, the combination of the first comparator 4, the integrating circuit 6 and the second comparator 7 causes the transistor Q to carry out switching action with a hysteresis characteristic, which is capable of avoiding misoperation of the control circuit A due to turbulent extraneous light or chattering of the relay RY, etc. as well as being able to absorb noise produced in the control circuit. With this hysteresis characteristic, the switching action of the transistor Q can be performed in response to the output of the second comparator 7 in an instantly responsive manner, but with reasonably long on and off state durations of the transistor.

When the output of the second comparator 7 is "1", that is, the ambient brightness is judged low by the control circuit A, the transistor Q is on with the coil of the relay RY energized and accordingly the make contacts RY.a of the relay RY are closed to light the lamp L. When the output of the second comparator 7 is "0", that is, the ambient brightness is judged high by the control circuit A, the transistor Q is off with the relay coil deenergized and accordingly, the make contacts RY.a are opened to turn off the lamp L. Even during the above-described automatic on-off control of the lamp L in response to the output of the sensor 1, it is possible to forcedly energize the relay RY to light the lamp L by switching on the cancelling switch SW3. In the arrangement of FIG. 1, this cancelling switch SW3, when closed, can hold the lamp L on even when the engine is not operated with the ignition switch SW1 in its open position.

Figure 2:
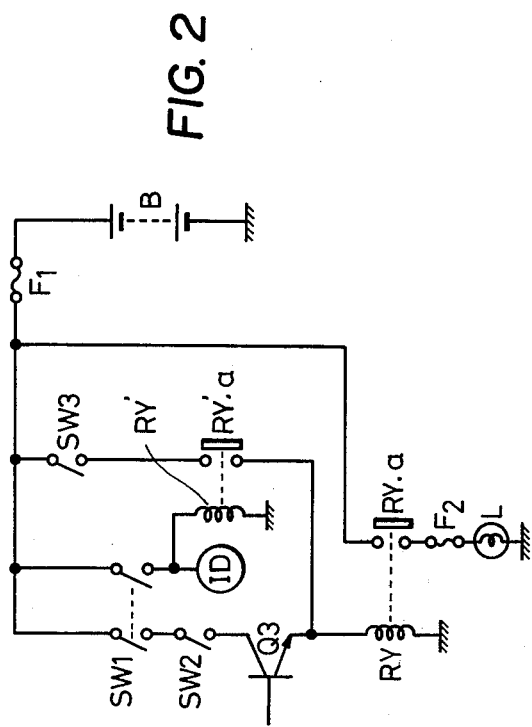
FIG. 2 is an electrical circuit diagram of a modification of the circuit arrangement of FIG. 1.

FIG. 2 shows a modification of the circuit arrangement of FIG. 1. In the circuit of FIG. 2, a further relay RY' is provided, with its coil connected to the contact of the ignition switch SW1 which is connected to the ignition device ID and its break contacts RY'.a connected in series with the cancelling switch SW3. According to this arrangement, the relay RY can be energized by turning the cancelling switch SW3 on when the ignition switch SW1 is on and is forcedly deenergized to relieve the circuit from the cancelled state, irrespective of on or off positions of the switch SW3, when the ignition switch SW1 is turned off, thus avoiding failure to turn the lamp L off due to the driver's inadvertency.

In FIG. 3, symbols VO1–VO5 represent different output voltage characteristics of the brightness sensor 1 which can be obtained by selecting different switches of the sensitivity adjusting block 2. The output characteristics of the comparators 4, 7 shown in FIGS. 3 (a)–(d) correspond to the output voltage characteristic VO1 of the sensor 1 obtained by selecting a particular one of the positions R1–R5 of the block 2, e.g., position R1. Symbols VR and VR' represent different set values of the reference voltage VR1, VR2 applied to the first and second comparators 4, 7, respectively. More specifically, the lower set value VR is used for on-off switching control of the head lamps of the vehicle and the higher set value VR' for on-off switching control of the side marker lamps, respectively. Thus, in on-off switching control of the side marker lamps, the transistor Q can be turned on or off at a higher ambient brightness than in on-off switching control of the head lamps, as shown in FIGS. 3 (c), (d), in view of the side marker lamps usually being turned on when the surroundings of the vehicle is still dusky. To carry out on-off switching control of the head lamps and the side marker lamps simultaneously, two sets of the light control systems shown in FIG. 1 may be provided in parallel with each other with respect to the battery B in which the reference voltages VR1, VR2 (which are equal to each other in the above-mentioned embodiment) are set at the value VR in the head lamp control system and at the value VR' in the side marker lamp control system, respectively.

In the light control system for vehicles of the invention, the brightness sensor 1, which is composed of a photo diode as previously mentioned, is arranged to operate under unbiased conditions, thus resulting in a simple arrangement of the sensor section as well as providing fail-safe function in a manner such that the lamp L is lighted when the sensor 1 is damaged or broken. Further, to enable the lamp L to be continuously lighted even during on-off switching control operations of the lamp L which is responsive to the sensor 1, an infrared-ray filter 16 may advantageously be mounted in a fashion surrounding the brightness sensor 1 as seen in FIG. 1, which filter has no sensitivity to light from a particular light source such as a sodium vapor lamp.

The automatic light control system for vehicles according to the invention is, of course, not limited to the arrangement of the above-described embodiment. Suitable variations or modifications may be added in the arrangement of FIG. 1. For instance, other ordinary types of electronic switches may be used in place of transistor Q. Further, the ignition switch SW1 may be arranged in the main circuit of the battery B instead of being arranged in the circuit of the relay RY as in the illustrated embodiment.

Figure 4:
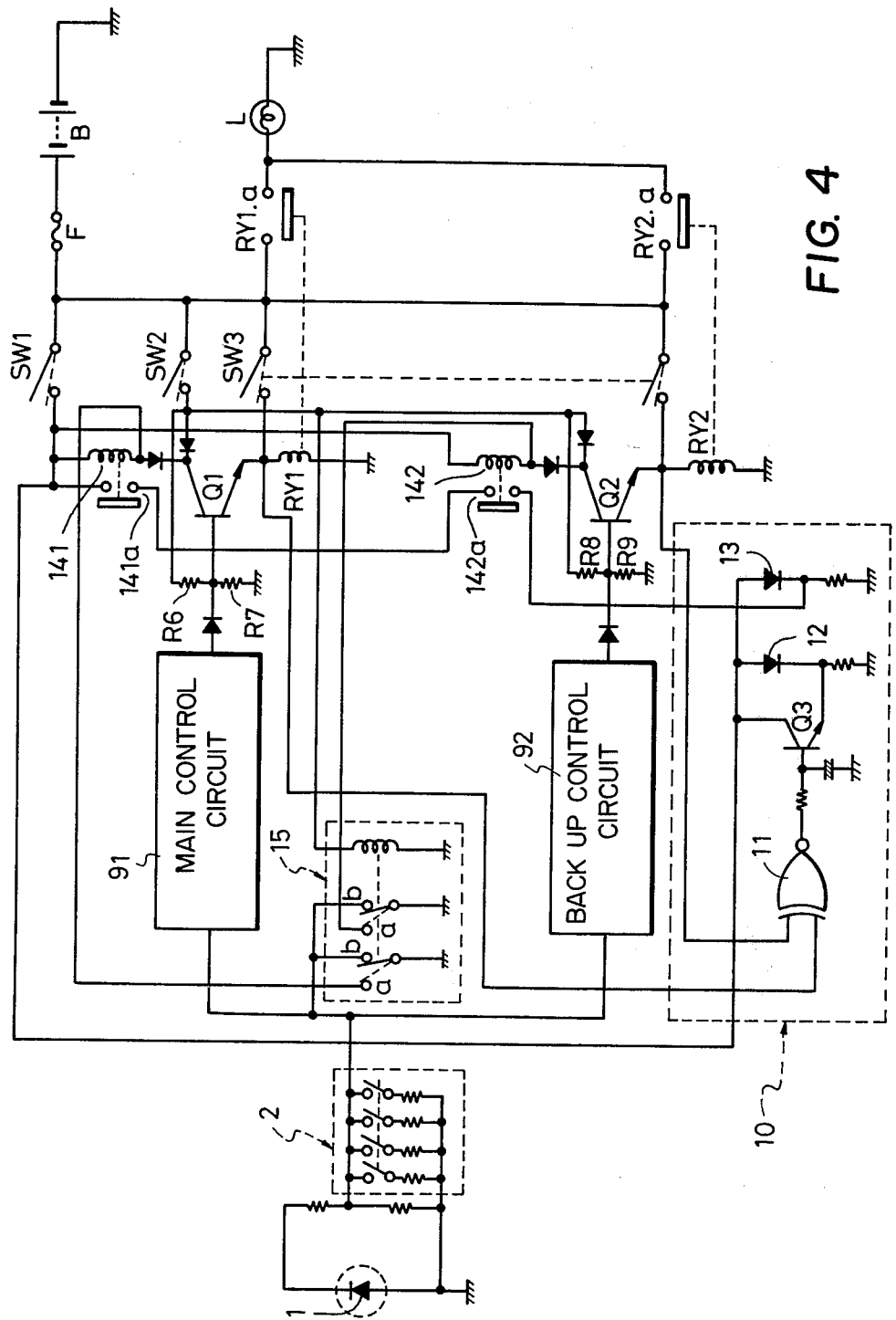
FIG. 4 is an electrical circuit diagram of the automatic light control system for vehicles according to another embodiment of the invention.

FIG. 4 illustrates another embodiment of the invention. In this embodiment, two sets of circuits based upon the fundamental circuit shown FIG. 1 are provided in parallel with each other and a monitor circuit 10 is integrally added for monitoring the operation of these circuits. In FIG. 4, like reference characters designate like or corresponding parts in FIG. 1. In FIG. 4, first and second groups each consisting of elements corresponding to the elements 3–8 of the fundamental circuit, transistor Q and relay RY of FIG. 1 are arranged in parallel with each other. In the first group, an assembly of elements 3–8, as shown in FIG. 1, is used as a main control circuit 91, while in the second group, a circuit of the same configuration as the circuit 91 is used as a back-up control circuit 92 (In FIG. 4, the circuits 91 and 92 are shown in blocks).

The monitor circuit 10 is formed of a coincidence circuit 11 which has two inputs connected to respective emitters of transistors Q1 and Q2 for discerning the coincidence between the outputs of the transistors Q1, Q2, a circuit consisting of a transistor Q3 and a light emission diode 12 in which the transistor Q3 switches on and off the diode 12 in response to the output of the coincidence circuit 11, and a circuit including another light emission diode 13 arranged in parallel with the light emission diode 12.

Checking relays 141 and 142 are connected in series to the collectors of transistors Q1 and Q2, respectively, with their switch contacts 141a and 142a connected in series between the cathode of the diode 13 of the monitor circuit 10 and the battery B. Further connected in parallel with the aforementioned first and second groups is another checking relay circuit 15 which keeps the inputs of the main control circuit 91 and the back-up control circuit 92 shorted to the ground when deenergized and is adapted to be energized by a current from the battery to short the coils of the relays 141, 142 to the ground when the light switch SW2 is closed.

According to this embodiment arranged as above, the parallel arrangement of the main control circuit 91 and the back-up control circuit 92 imparts a fail-safe function to the whole system, wherein the monitor circuit 10 always diagnoses whether or not the groups including the main control circuit 91 and the back-up control circuit 92 both properly operate, to detect and display any trouble occurring in either of these groups.

More specifically, when the ignition switch SW1 is on and the light switch SW2 is off (accordingly, the coil of the checking relay circuit 15 is in a deenergized state with the inputs of the main and back-up circuits 91, 92 shorted to the ground), there occur flows of checking current through the circuit formed by the checking relay 141, the transistor Q1 and the coil of the relay RY1 and the circuit formed by the checking relay 142, the transistor Q2 and the coil of the relay RY2, respectively, to cause the make contacts of the relays 141, 142 to be closed. Thus, a positive bias voltage is applied to the cathode of the light emission diode 13 to keep the diode 13 in a non-lit state.

Pairs of series-connected bias resistances R6,R7 and R8, R9 are connected at their junctions to the bases of the respective transistors Q1, Q2 to allow a slight amount of base current to flow in the transistors Q1, Q2 even when the main control circuit 91 and the back-up control circuit 92 produce an output "L".

With the above switches SW1 and SW2 respectively in the above-mentioned positions, failure of any one of the main control circuit 91, the back-up circuit 92, the transistors Q1, Q2 and the checking relays 141, 142 causes interruption of the checking current flow. At the same time, the make contacts 141a, 142a of the checking relays 141, 142 are opened to cause the light emission diode 13 to be lighted, thus displaying the failure. The amount of the checking current is almost determined by the coil impedances of the checking relays 141, 142 alone and is set at such a small value that the relays RY1 and RY2 cannot be energized by the checking current.

When the ignition switch SW1 and the light switch SW2 are both on, the checking current also flows through the coil of the checking relay circuit 15 by way of the light switch SW2. Thus, the circuit 15 is energized to cause the two break contacts to trip from the respective terminals b to the respective terminals a so that the output signal from the brightness sensor 1 is applied to the main control circuit 91 and the back-up control circuit 92.

Under this situation, the outputs of the main control circuit 91 and the back-up control circuit 92 (to be exact, the outputs of transistors Q1 and Q2) are always monitored by the coincidence circuit 11 of the monitor circuit 10. If both circuits 91 and 92 properly operate to produce "L" or "H" at the same time, the coincidence circuit 11 produces a coincidence output "H" to energize the transistor Q3. Accordingly, the light emission diode 12 is shorted to be held off. On this occasion, if any trouble occurs in either the circuit system of the main control circuit 91 and the transistor Q1 or the circuit system of the back-up control circuit 92 and the transistor Q2 so that the outputs of these circuit systems differ from each other, the coincidence circuit 11 produces an uncoincidence output "L" to turn off the transistor Q3. Thus, the diode 12 is lighted to display the abnormality. During this control operation of the coincidence circuit 11, the circuits of the checking relays 141,142 also operate simultaneously, providing double monitoring of the two control circuit systems.

Although in this embodiment, notification of abnormalities is effected in the form of light display using light emission diodes, sound alarm means may be used for such notification instead.

As will be apparent to persons skilled in the art, various modifications and variations of the foregoing specific disclosure can be made without departing from the teachings of the present invention.

What is claimed is:

1. An automatic light control system for an automotive vehicle having lights, comprising:
   (1) a direct current power source;
   (2) an ignition switch connected to said power source;
   (3) a first switch connected to said power source;
   (4) a second switch connected to said power source by way of said first switch, said second switch being electronically actuable;
   (5) relay means connected to said lights and adapted to be energized in response to concurrent closing of said first switch and energization of said second switch;
   (6) a brightness sensor responsive to ambient brightness in the vicinity of the vehicle to produce an output signal as a function of the ambient brightness;
   (7) amplifier means for amplifying said output signal;
   (8) comparator means for comparing the output signal of said brightness sensor and a predetermined reference signal to switch said second switch in response to a difference between said two signals; said comparator means including a first comparator connected to said brightness sensor for comparing said output signal from said brightness sensor with a first predetermined reference voltage; an integrating circuit for integrating an output voltage from said first comparator; and a second comparator adapted to compare an integral output voltage from said integrating circuit with a second reference voltage; whereby said second switch is actuated by an output from said second comparator for switching action with an effective delay duration characteristic with respect to the output of said brightness sensor; and
   (9) a third switch connected in parallel with said first and second switches for energizing, at a closed position thereof, said relay means, irrespective of the switched condition of said first and second switches, said third switch operating independently of the ignition switch, whereby said lights are energized upon energization of said relay means, and, with said first switch and the ignition switch in closed condition, said lights are automatically responsive to the ambient brightness in the vicinity of the vehicle.

2. The automatic light control system as claimed in claim 1 wherein said brightness sensor is provided with an infrared-ray filter therearound.

3. An automatic light control system for an automotive vehicle having lights, comprising:
   (1) a direct current power source;
   (2) an ignition switch connected to said power source;
   (3) a first switch connected with said power source;
   (4) a brightness sensor responsive to ambient brightness in the vicinity of the vehicle to produce an output signal as a function of the ambient brightness;

(5) a first and a second control circuit connected in parallel with each other and between said first switch and said brightness sensor, each including a second switch connected to said power source by way of said first switch and electronically actuatable, relay means connected to said lights and adapted to be energized in response to concurrent closing of said first switch and energization of at least one said second switch, and comparator means for comparing the output signal of said brightness sensor and a predetermined reference signal to switch said second switch in response to a difference between said two signals;

(6) a third switch connected in parallel with said first switch and at least one said second switch for energizing, at a closed position thereof, said relay means, irrespective of the switched condition of said first switch and at least one said second switch, the operation of said third switch being independent of the ignition switch; and (7) a monitor circuit responsive to outputs of said first and second control circuits to issue an alarm when said respective outputs are not equal;

said lights being energized upon energization of one or more said relay means, whereby said lights are automatically responsive to the ambient brightness in the vicinity of the vehicle, and said first and second control circuits each serve as a back-up circuit for the other.

4. The automatic light control system as claimed in claim 3, said automotive vehicle carrying an engine provided with an ignition device, the light control system further comprising a fourth switch connected to said direct current power source for energizing, at a closed position thereof, said ignition device, and a checking circuit including a pair of second relay means each adapted to be energized in response to concurrent closing of said fourth and second switches, the second relay means having switch contacts disposed in series with each other, said monitor circuit being responsive to said series disposed switch contacts to issue an alarm upon occurrence of current breakage in said checking circuit.

5. The automatic light control system as claimed in claim 3 or claim 4, further comprising a second checking circuit including third relay means which is arranged to apply a signal having a first potential to the inputs of said first and second control circuits to prohibit the output signal of said brightness sensor from being applied to said inputs of said first and second control circuits upon opening of said first switch and permit the output signal of said brightness sensor to be applied to said inputs of said first and second control circuits upon closing of said first switch.

6. An automatic light control system for an automotive vehicle having lights and carrying an engine provided with an ignition device, comprising:
(1) a direct current power source;
(2) a first switch connected to said power source;
(3) a second switch connected to said power source by way of said first switch, said second switch being electronically actuatable;
(4) first relay means connected to said lights and adapted to be energized in response to concurrent closing of said first switch and energization of said second switch;
(5) a brightness sensor responsive to ambient brightness in the vicinity of the vehicle to produce an output signal as a function of the ambient brightness;
(6) comparator means for comparing the output signal of said brightness sensor and a predetermined reference signal to switch said second switch in response to a difference between said two signals;
(7) a third switch connected in parallel with said first and second switches for energizing, at a closed position thereof, said relay means irrespective of the switched condition of said first and second switches;
(8) a fourth switch connected to said direct current power source for energization, at a closed position thereof, said ignition device; and
(9) second relay means, having contacts, said contacts being connected in series with said third switch and being arranged for energization responsive to the switched condition of said fourth switch, whereby said first relay means can be energized by closing said third switch when said fourth switch is closed and is de-energized, irrespective of the switched condition of said third switch, when said fourth switch is opened, whereby said lights are energized upon energization of said relay means, and, with said first switch and fourth switch in closed condition, said lights are automatically responsive to the ambient brightness in the vicinity of the vehicle.

7. An automatic light control system for an automotive vehicle having lights, comprising:
(1) a direct current power source;
(2) an ignition switch connected to said power source for energizing an ignition device of the vehicle;
(3) a first switch connected to said power source;
(4) a second switch connected to said power source by way of said first switch, said second switch being electronically actuatable;
(5) relay means connected to said lights and adapted to be energized in response to concurrent closing of said first switch and energization of said second switch;
(6) a brightness sensor responsive to ambient brightness in the vicinity of the vehicle to produce an output signal as a function of the ambient brightness;
(7) amplifier means for amplifying said output signal; and
(8) comparator means for comparing the output signal of said brightness sensor and a predetermined reference signal to switch said second switch in response to a difference between said two signals, said comparator means including a first comparator connected to said brightness sensor for comparing said output signal from said brightness sensor with a first predetermined reference voltage; an integrating circuit for integrating an output voltage from said first comparator; and a second comparator adapted to compare an integral output voltage from said integrating circuit with a second reference voltage whereby said second switch is actuated by an output from said second comparator for switching action with an effective delay duration characteristic with respect to the output of said brightness sensor;

whereby said lights are energized upon energization of said relay means, and, with said first switch and ignition switch in closed condition, said lights are automatically responsive to the ambient brightness in the vicinity of the vehicle.

8. An automatic light control system for an automotive vehicle having lights and carrying an engine provided with an ignition device, comprising:
(1) a direct current power source;
(2) a first switch connected to said power source;
(3) a second switch connected to said power source by way of said first switch, said second switch being electronically actuatable;
(4) first relay means connected to said lights and adapted to be energized in response to concurrent closing of said first and second switches;
(5) a brightness sensor responsive to ambient brightness in the vicinity of the vehicle to produce an output signal as a function of the ambient brightness;
(6) comparator means comprising a first comparator connected to said brightness sensor for comparing said output signal from said brightness sensor with a first predetermined reference voltage, an integrating circuit for integrating an output voltage from said comparator, and a second comparator adapted to compare an integral output voltage from said integrating circuit with a second predetermined reference voltage whereby said second switch is actuated by an output from said second comparator for switching action with an effective delay duration characteristic with respect to the output of said brightness sensor;
(7) a third switch;
(8) a fourth switch connected to said direct current power source for energizing, at a closed position thereof, said ignition device; and
(9) second relay means having contacts thereof connected in series with said third switch and arranged for energization responsive to the switched condition of said fourth switch, said series connected third switch and second relay means contacts being connected in parallel with said first and second switches for energizing said first relay means in response to closing of said third switch and closing of said fourth switch;
whereby said lights are energized upon energization of said first relay means, and, with said first switch and said fourth switch in closed condition, said lights are automatically responsive to the ambient brightness in the vicinity of the vehicle, and said first relay means being energized by closing said third switch when said fourth switch is closed and being de-energized, irrespective of the switched condition of said third switch, when said fourth switch is opened.

9. An automatic light control system for an automotive vehicle having lights, comprising:
(1) a direct current power source;
(2) an ignition switch connected to said power source for switching on and off an ignition device of the vehicle;
(3) a first switch connected with said power source;
(4) a brightness sensor responsive to ambient brightness in the vicinity of the vehicle to produce an output signal as a function of the ambient brightness;
(5) a first and a second control circuit connected in parallel with each other and between said first switch and said brightness sensor, each including a second switch connected to said power source by way of said first switch and electronically actuatable, relay means connected to said lights and adapted to be energized in response to concurrent closing of said first switch and said second switch, and comparator means for comparing the output signal of said brightness sensor and a predetermined reference signal to switch said second switch in response to a difference between said two signals; and
(6) a monitor circuit responsive to outputs of said first and second control circuits to issue an alarm when said respective outputs are not equal;
said lights being energized upon energization of one or more said relay means, whereby said lights are automatically responsive to the ambient brightness in the vicinity of the vehicle, and said first and second control circuits each serve as a back-up circuit for the other.

10. An automatic light control system for an automotive vehicle having lights and carrying an engine provided with an ignition device, the control system comprising:
(1) a direct current power source;
(2) an ignition switch connected to said power source for switching on and off said ignition device;
(3) a first switch connected with said power source;
(4) a brightness sensor responsive to ambient brightness in the vicinity of the vehicle to produce an output signal as a function of the ambient brightness;
(5) a first and a second control circuit connected in parallel with each other and between said first switch and said brightness sensor, each including a second switch connected to said power source by way of said first switch and electronically actuatable, relay means connected to said lights and adapted to be energized in response to concurrent closing of said first switch and said second switch, and comparator means for comparing the output signal of said brightness sensor with a predetermined reference signal to switch said second switch in response to a difference between said two signals;
(6) a third switch connected in parallel with said first switch and at least one said second switch for energizing, at a closed position thereof, at least one said relay means, irrespective of the switching conditions of said first switch and said at least one second switch;
(7) a fourth switch connected to said direct current source for energizing, at a closed position thereof, said ignition device;
(8) a first checking circuit including second and third relay means, each disposed in series circuit relationship with said fourth switch and a respective one of said second switches for being energized in response to concurrent closing of said fourth and second switches, the second and third relay means having switch contacts disposed in series with each other;
(9a second checking circuit including fourth relay means for applying a signal having a first potential to the inputs of said first and second control circuits upon opening of said first switch and for applying the output signal of said brightness sensor to said inputs of said first and second control circuits upon closing of said first switch; and

(10) a monitor circuit responsive to outputs from said first and second control circuits to issue an alarm when said respective outputs are not equal and further responsive to said series disposed switch contacts of said second and third relay means to issue an alarm upon occurrence of current breakage in said checking circuit;

said lights being energized upon energization of one or more of said relay means of said first and second control circuits, whereby said lights are automatically responsive to the ambient brightness in the vicinity of the vehicle, said first and second control circuits serving as back-up circuits for each other.

11. The automotive light control system as claimed in any one of claims 1, 6, 7 or 8 wherein the brightness sensor is adapted for unbiased operation wherein at least one terminal of the sensor is grounded.

* * * * *